Fig.1 "PRIOR ART"
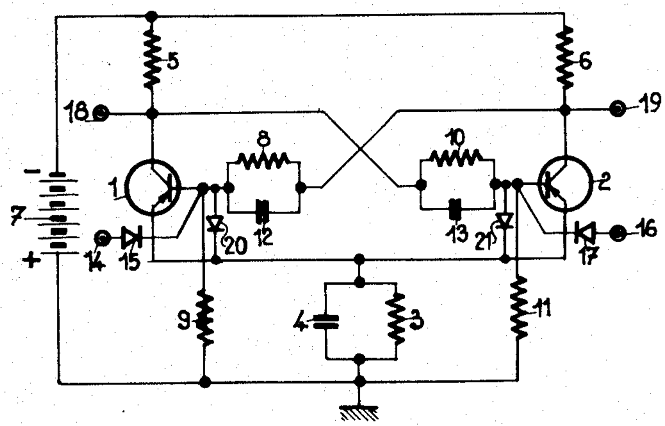
Fig.2 "PRIOR ART"
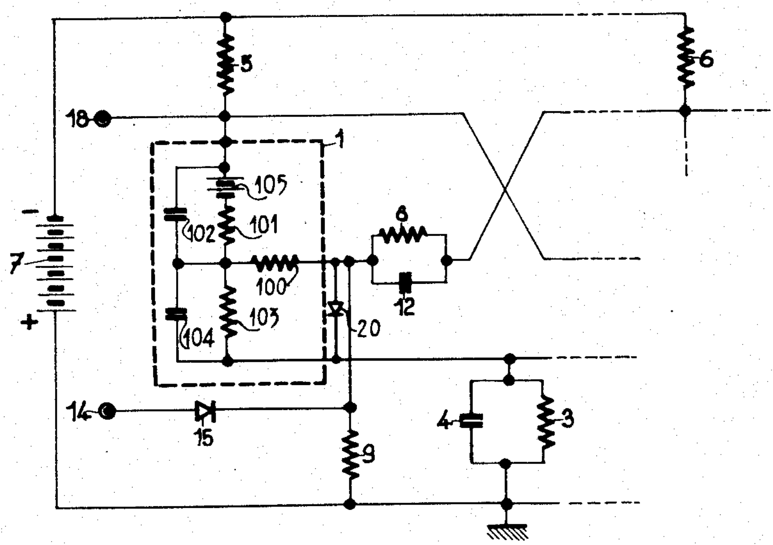
INVENTORS.
Robert Mauduech
Raymond Gouttebel
BY C. A. Gulbrandsen
Atty.

Fig·5
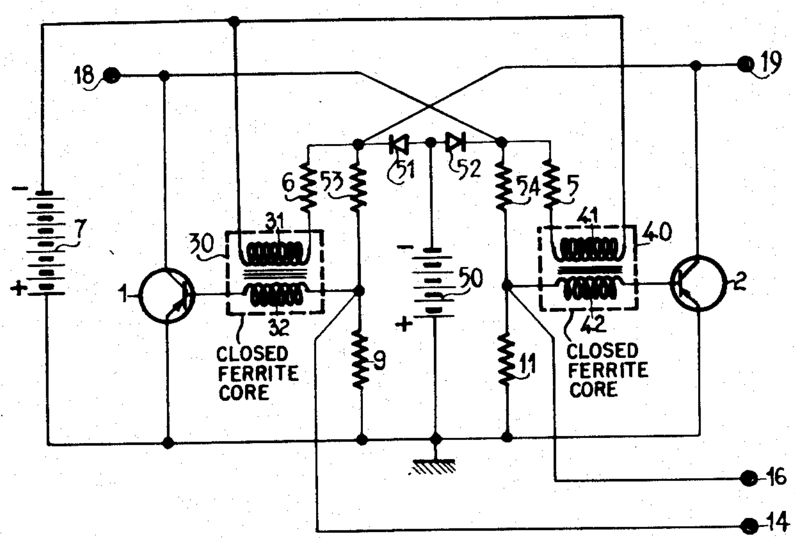
Fig. 3 "PRIOR ART"
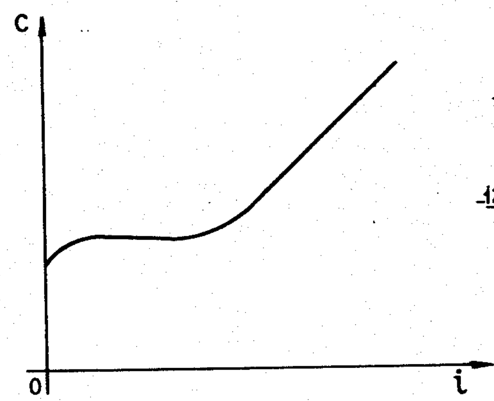
Fig. 4 "PRIOR ART"
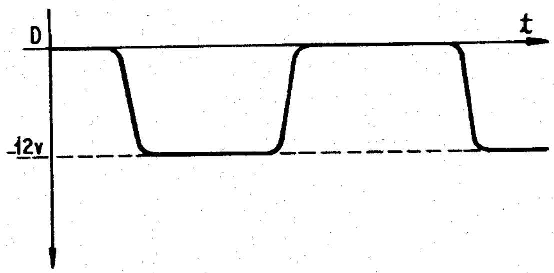
INVENTORS.
Robert Mauduech
Raymond Gouttebel
BY
C. A. Gulbrandsen
Atty.

INVENTORS
Robert Mauduech
Raymond Gouttebel
BY
C. A. Gulbrandsen
Atty.

*INVENTORS*
Robert Mauduech
Raymond Gouttebel
*BY* C. A. Gulbrandsen
Atty.

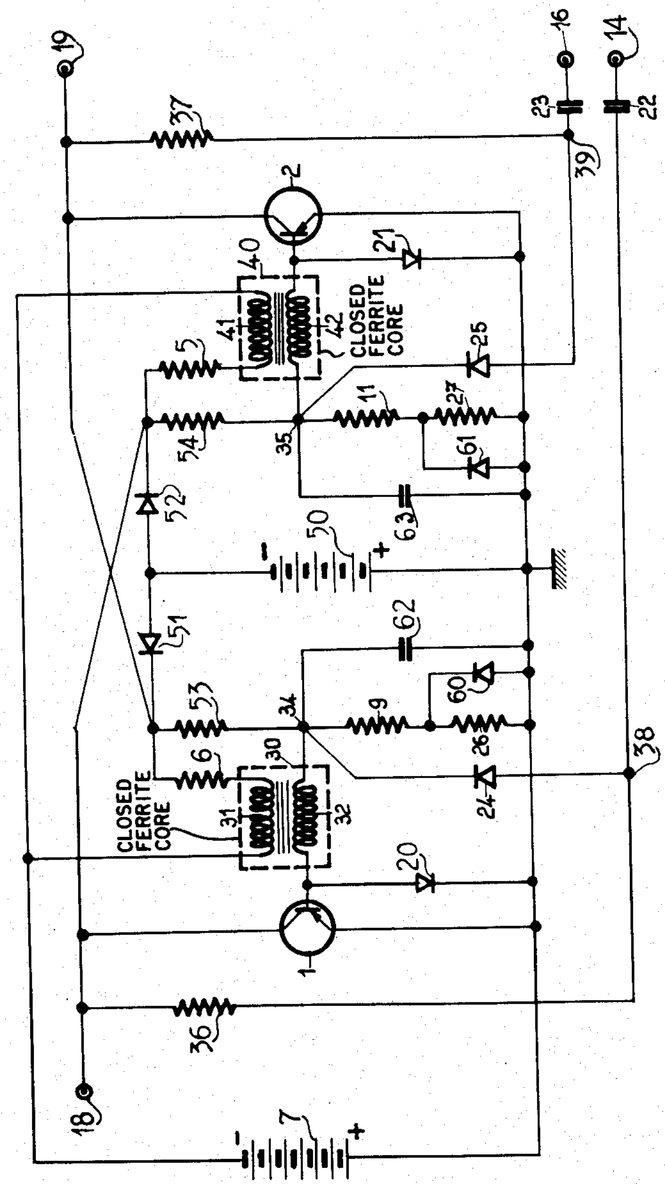
INVENTORS.
Robert Mauduech
Raymond Gouttebel
BY
C. A. Gullbrandsen
Atty.

United States Patent Office 3,140,404 Patented July 7, 1964

3,140,404

ECCLES-JORDAN FLIP-FLOP WITH CLOSED FERRITE CORES IN THE CROSS-COUPLING PATHS

Robert Mauduech, Paris, and Raymond Gouttebel, Clamart, France, assignors to Automatic Electric Laboratories, Inc., a corporation of Delaware Filed Oct. 5, 1959, Ser. No. 844,392
Claims priority, application France Oct. 17, 1958
1 Claim. (Cl. 307—88.5)

The present invention relates to improvements effected in trigger circuits including in their composition transistor type active elements, such as those known under the name of "junction type transistors."

It should be understood that we mean by a trigger circuit a circuit having two stable states characterized by electrical conditions of distinctive values. Such a circuit may be switched alternatively from one to the other of its stable states by the application of electrical triggering impulses to the input of the said circuit.

It should also be understood that the term "trigger circuit" designates several types of circuits, such as lockup circuits, binary trigger circuits, and two terminal trigger circuits of the "Eccles-Jordan" type.

In the present patent there will be described, as an example, a trigger circuit having two stable states, or a bistable circuit, based on the Eccles-Jordan circuit. This type of circuit is also designated under the names of bistable multivibrator, or seesaw, or "flip-flop" circuit; it is used constantly in switching networks, in counting circuits, and as constitutive components of computers of the electronic type.

In general, a bistable circuit comprises two transistors connected in cross by two-terminal R.-C. networks, composed of a resistance and a capacitance connected in parallel. The various polarizing voltages of these two transistors have appropriate values such that one of the transistors is in a high state of conductivity while the other is maintained in a state of conductivity practically null; otherwise stated, the first transistor is blocked while the other is unblocked or "passing."

It is known that the change of state of a transistor trigger circuit has a cumulative effect which causes the values of current and voltage to pass rapidly from one extreme to the other, these extreme values being defined by the phenomena of cutoff and saturation peculiar to the transistors. In the transistory switching stage which consistitutes such a change of state of a bistable circuit, the unblocked transistor acts considerably like a linear amplifier, and in consequence, can respond very rapidly to the impulses which provoke its conductive state. But when the said transistor becomes saturated, its time of response to a blocking impulse increases; otherwise stated, it acquires inertia, and in consequence, becomes slow.

It is well known that this phenomenon is due to the presence, in the region of the base of the saturated transistor, of excess minoritory carriers which must be eliminated before the transistor can operate again properly. We also know that it is possible to accelerate the elimination of the excess carriers by the application of an inverse polarity causing an inverse current to circulate in the base of the transistor involved during the interval of transition. This method of operation however, has only a limited effect, and since the inertia of a saturated transistor is evidently one of the principal factors on which the speed of operation depends, it is worth the while to have recourse to a more efficacious means of reducing this inertia.

It is an object of the invention to obtain an improved trigger circuit equipped with junction transistors and capable of operating at impulse frequencies superior to those of prior circuits of this type.

It is another object of the invention to obtain, at the outputs of the trigger circuit, signals whose representative diagram shows fronts of very short duration.

It is another object of the invention to make the final state of the transistor trigger circuit substantially independent of the transistors employed, by a high speed of reversal of the said circuit.

Another object of the invention is to provide an assembly susceptible of being utilized, after minor modifications, as a trigger circuit of the type desired: lockup circuit, binary triggering circuit, or bistable trigger circuit.

Of course, the trigger circuits of the invention satisfy the conditions desired for this type of circuit, that is to say that they are stable, of relatively simple construction and small size, that they require a minimum consumption of energy, and produce output pulses of sufficient amplitude to cause operation of the load circuits to which they are connected without this being done to the detriment of the speed of switching.

It is well known that the operation of a trigger circuit depends on the transitory effects due to the capacities of the R.-C. coupling inserted in the assembly and to the negative reactive impedances introduced by the two transistors of the said circuit. These latter impedances, which may be likened, to a certain degree, to R.-C. circuits (resistance-capacity in parallel) vary during the transitory states with the outputs of the transistors. There follows from this that for an optimum functioning of such a trigger circuit, the choice of the coupling capacities should result in a compromise between the speed of reversal and the steepness of the blocking and unblocking fronts of the output signals.

In order to remedy this inconvenience, the trigger circuit of the invention no longer employs R.-C. type coupling networks. These are replaced by transformers whose windings are close coupled. These transformers are made with ferrite cores currently employed in low current devices.

The fact of using linking transformers in a trigger circuit to effect the transfer of the triggering control impulse from the collector of one of the transistors to the base of the other transistor permits operating the said trigger circuit independently of the characteristics of the transistors at a higher rate of recurrence, while reducing the duration of the fronts of the output pulses, by the adaptation of the collector and base impedances, which results in the maximum transfer of electrical energy for the triggering control signal.

Other objects and features of the present invention will better appear from the following disclosure, which describes a non-limitative method of practicing the invention, with reference to the appended drawings, in which:

FIG. 1 represents a bistable transistor trigger circuit of the standard type;

FIG. 2 represents the left portion of the trigger circuit of FIG. 1, wherein the transistor associated with this left portion has been replaced by its equivalent electrical schematic;

FIG. 3 shows how the emitter-base capacity of a transistor of normal type varies as a function of the output of the said transistor;

FIG. 4 represents the diagram of the output signals obtained with the trigger circuit of FIG. 1;

FIG. 5 shows a first schematic of a transistor trigger circuit equipped with coupling transformers in accordance with the invention;

Figure 6:
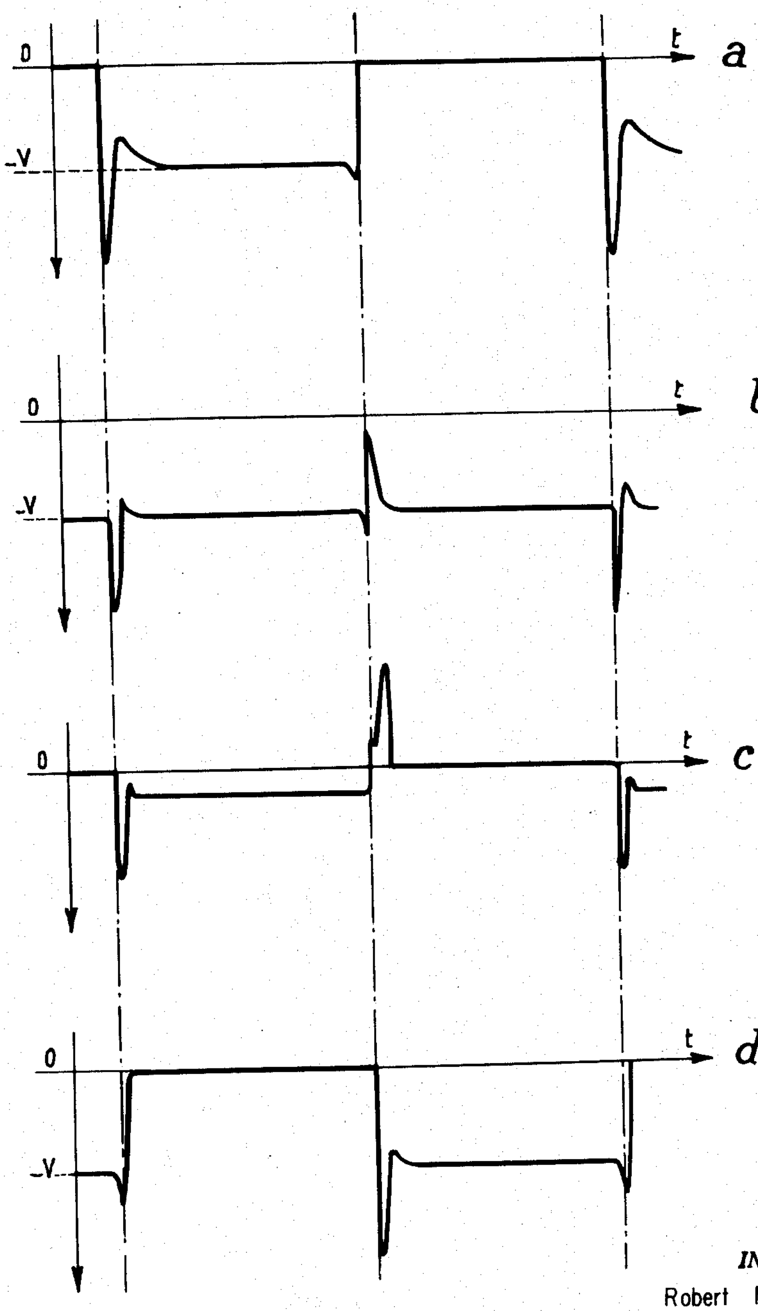
Figure 7:
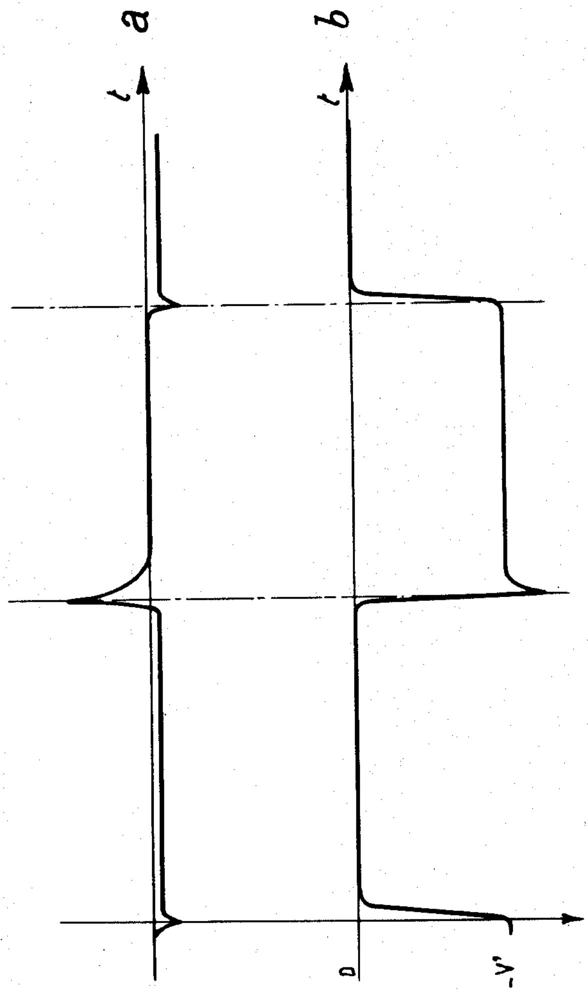

FIG. 6 gives oscillograph readings taken at different points of the trigger circuit of the invention;

FIG. 7 gives oscillograph readings taken at different points of the trigger circuit of the invention when two diodes are introduced into this circuit, at appropriate points;

FIG. 8 represents the schematic of the trigger circuit of the invention according to FIG. 5 to which some improvements have been added.

In order to provide a better understanding of the explanations which will be given regarding the arrangement of the invention, there will be reviewed hereinafter the operation of a transistor bistable trigger circuit of the standard type, such as that shown in FIG. 1. Without it being necessary to describe such a circuit in detail, we may note therein the following points:

The emitters of the transistors 1 and 2 are coupled by a common resistance 3 shunted by a capacity 4 which can participate to a certain extent in the acceleration of the time of establishment of the output signals.

The coupling condensers 12 and 13, respectively connected in parallel to the terminals of the coupling resistances 8 and 10, assure the short-circuit of the collector of each transistor to the base of the other during the time of the reversal; they increase the speed of reversal of the trigger circuit by approximately offsetting the transitory effects due to the negative reactive impedances proper to the transistors 1 and 2.

The presence of the diodes 15 and 17 is particularly useful when the trigger circuit is used as a binary counter, that is, when the signals to be counted are applied to the trigger circuit by way of a single input obtained by interconnecting the terminals 14 and 16.

The output signals are collected on the one hand at the terminal 18, a point common to the transistor 1 and its load resistance 5 and on the other hand to the terminal 19, a point common to the transistor and the load resistance 6.

To facilitate the explanation to follow, it will be assumed that the transistors employed are of the type P-N-P. The operation of a circuit employing transistors of the N-P-N type would be the same except for the signs of the currents and voltages.

Following the application of the suitable potential to the base of the transistor 1 via the inlet 14 and the diode 15, the trigger circuit of FIG. 1 is in a first stable state where the transistor 1 is blocked and the transistor 2 is passing. The potential of the base of the transistor 2 has a slightly negative value $-V'$ obtained from the $-V$ voltage of the source 7, by way of the group of resistances 5, 10 and 11. The potential of its collector is approximately zero, and, applied to the base of the transistor 1, maintains the latter blocked. To cause the trigger circuit to pass from the first stable state to the second stable state, it is necessary to apply a positive blocking impulse to the base of the transistor 2, by way of the inlet 16 and the diode 17. The collector of transistor 2 thereupon delivers a negative unblocking impulse to the base of transistor 1 carried to the potential $-V'$ by the resistances 6, 8 and 9. The transistor 1 passes current in its turn, and the approximately zero potential of its collector maintains transistor 2 blocked.

It is advantageous to control the change of state of a trigger circuit of this type with impulses of short duration with respect to the time taken by the said trigger circuit to pass from one state to the other.

It is evident that to modify the state of such a trigger circuit, it is equally possible to utilize an electrical impulse unblocking one of the transistors instead of blocking the other. Experience shows that the blocking impulses give rise to higher speeds of reversal.

To appreciate the influence of the parameters proper to the transistors 1 and 2, reference will be made to FIG. 2, where the transistor 1 has been replaced by an approximately equivalent electrical schematic in which:

100 is the base resistance,

101 and 102 are respectively the resistance and the capacity of the collector circuit,

103 and 104 are respectively the resistance and the capacitance of the emitter circuit,

105 is a source characterizing in intensity the active operation of the transistor 1.

These different resistances and capacitances characterize the transistor 1 in the neighborhood of a given point of its operation; their values vary with the position of the point of operation.

When the transistor 1 is blocked, its output is nil; the resistances 101 and 103 have high values, whereas the capacities 102 and 104 have low values.

When the transistor 1 is unblocked, its output, limited by the resistance 5, corresponds to the maximum of its strength, allowing for its inertia. The resistances 101 and 103 have low values, whereas the capacities 102 and 104 have high values. As is seen in FIG. 3, the emitter-base capacity "*c*" increases with the output "*i*" of the transistor. The increase of this capacity 104 is due to the growth of the electrical field in the emitter-base junction, because of the presence of excess minoritory carriers in the base electrode of the saturated transistor. The collector-base capacity varies proportionately to the square root of the voltage V given by the source 7. The collector-base and emitter-base resistances 101 and 103 vary like the resistance of a semi-conductor diode, that is to say, that their values diminish when the output of the transistor increases. The value of the emitter-base resistance 103 is however always several times greater than that of the collector-base resistance 101. Accordingly, the resistance 101 practically short-circuits the capacity 102, whereas the resistance 103 retains a value which may reach several hundred ohms. The capacity 104 is therefore not short-circuited. When the transistor is blocked, the capacity 104, at the minimum of its value, is charged, presenting a positive polarity on the side of the base and a negative polarity on the side of the emitter. When the transisor is unblocked, its emitter-base capacity increases to its maximum. Its previous charge should be nullified before the collector current begins, and it is necessary that it be charged in the opposite sense in order for the collector current to be able to reach its saturation value. As shown in FIG. 4, the diagram of the output signals at the terminal 18 during the unblocking operation of the transistor 1 presents a front having the appearance of an exponential curve with a positive exponent. When, on the other hand, the transistor 1 becomes blocked, its own emitter-base capacity 14, which again takes a low value, has little influence, as experience confirms, on the interruption of its collector current.

This interruption is however, retarded by the presence in the base of excess minoritory carriers whose emigration creates an inverse base current in the base circuit external to the transistor. The interruption of the current at the outlet 18 of the collector circuit of the transistor 1 is also prolonged by the presence in this circuit by the coupling capacity 13 and the emitter-base capacity of the transistor 2.

As is shown in FIG. 4, the diagram of the output signals at the terminal 18 during the blocking operation of transistor 1 presents a front having the appearance of an exponential curve with a negative exponent.

To summarize, the values of the emitter capacities of the transistors 1 and 2 have a considerable influence on the speed of reversal, and on the squareness of the output signals at the instants of blocking and unblocking.

In order to improve the operation of a trigger circuit, it is therefore necessary to add to this arrangement devices modifying the conditions of charge of the emitter capacities.

A partial solution utilized in certain trigger circuits of the prior art consists in placing between the base and the emitter of the transistors 1 and 2, diodes 20 and 21, conductive in the base-emitter direction.

The diode 20 assists the unblocking of the transistor 1, because it accelerates the charge of its emitter capacity 104 in two ways: on the one hand, it narrowly limits the inverse charge of the capacity 104 and maintains the potential of the base of the transistor 1 very close to the potential of its emitter while it is blocked, and on the other hand, at the moment of unblocking of the transistor 1, it offers a path of almost zero resistance to the base current, which thus acquires a greater intensity.

In addition, experience shows that the diode 20 likewise reduces the blocking time of the transistor 1.

Another partial solution of the prior art consists in increasing the passing band of the two amplifiers constituted by each half of the trigger circuit. The load resistances 5 and 6 are complemented by inductance coils connected in series. The transitory phenomena obtained by the adjunction of these inductances give rise to a ballistic overthrow on blocking.

Another solution consists in reinforcing the unblocking impulse applied to the terminal 14, as for example by adjoining to the arrangement of FIG. 1 two new transistors as devices for transferring the unblocking impulse from the collector of one of the transistors to the base of the other transistor. The charging current of the emitter capacitance of the transistor being amplified, the charging of the said emitter capacitance is effected in a very short time, and the onset of the unblocking front is produced rapidly.

The solution which is the object of the present invention consists in injecting into the trigger circuit high intensity control signals acting on the bases of the transistors of the assembly by the intermediary of transformers which replace the R.-C. coupling circuits 8, 12 and 10, 13 of FIG. 1, assuring both the coupling and a particularly advantageous transformation of impedance between the collector circuit of one of the transistors of the trigger circuit and the base circuit of the other transistor of the assembly, and vice-versa.

FIG. 5 gives a first schematic of a transistor trigger circuit equipped with coupling transformers according to the invention.

The base circuit of the transistor 1, including the secondary winding 32, and the collector circuit of the transistor 2, including the primary winding 31 and the load resistance 6, are coupled by the transformer 30.

Similarly, the base circuit of the transistor 2, including the secondary winding 42, and the collector circuit of the transistor 1, including the primary winding 41 and the load resistance 5, are coupled by the transformer 40.

The base of the transistor 1 is fed, through the winding 32, by the direct current generator 50, which is connected to the terminals of the potentiometric device constituted by the diode 51 and the resistances 53 and 9 in series.

The base of the transistor 2 is fed, through the winding 42, by the direct current generator 50, which is connected to the terminals of the potentiometric device formed by the diode 52 and the resistances 54 and 11.

The feeding of the collector circuits of the transistors by means of the direct current generator 7 is effected by way of the winding 41 and the load resistance 5 for the transistor 1, and by way of the winding 31 and the load resistance 6 for the transistor 2. As it has already been stated, the transformers 30 and 40, made of ferrite cores of a standard type, are close coupled.

The specifications of these two transformers are evidently identical; they are determined experimentally in order to obtain oscillographic readings showing that the transitory phenomena due to the windings of the said transformers act in a sense favorable to the operation of the trigger circuit. It is necessary however, to take note of the fact that the transformation ratio of the two transformers involved should be such that the currents circulating in the secondary windings 32 and 42 associated with the bases of the transistors of the trigger circuit, should be greater than the currents which circulate in the respective primary windings 31 and 41.

The diodes 51 and 52, polarized by a negative voltage —V', have their passing senses so oriented that they limit the voltages of the signals collected at the outlets 18 and 19 of the trigger circuit. They have an important role on the shape of the signals found at certain points of the trigger assembly.

FIG. 6 gives four oscillographic readings relating to an arrangement analogous to that of the FIGURE 5, but not having the diodes 51 and 52.

When a positive impulse is applied to the input terminal 14 of the trigger circuit (the diodes 51 and 52 being eliminated), the collector circuit of the transistor 1 gives a signal at the output terminal 18 presenting the appearance of the curve "*a*" of the FIGURE 6. The negative "spikes" observed on this curve "*a*" are due to the presence of the primary 41 in this collector circuit. These "spikes" appear at the blocking front of the transistor 1 when the previously blocked transistor 2 still presents a high impedance. These same spikes do not exist at the unblocking front, during which the impedance of the transistor 1 takes a value substantially less than a hundred ohms. However, the said spikes appear at the terminals of the primary winding 41 of the transformer 40 (FIG. 6, curve "*b*"), because the load resistance 5 masks the low impedance of the transistor 1.

The curve "*c*" of FIGURE 6 gives the shape of the signal obtained in the base circuit of the transistor 2. The almost null portion of this signal corresponds to the blocked state of the transistor 2; the slightly negative portion corresponds to the passing state of this same transistor 2.

The curve "*d*" of FIGURE 6 represents the signals in the collector circuit of the transistor 2 at the output terminal 19. These signals are the same as those collected at the output terminal 18; they are however in phase opposition with them.

When the diodes 51 and 52 are introduced into the arrangement of FIGURE 5, the signals represented in FIG. 6 (curves "*c*" and "*d*") take respectively the shapes of the curves "*a*" and "*b*" of FIG. 7.

As already stated, the ballistic overthrows are eliminated. In the base circuit of the transistor 2 (FIG. 7, curve "*a*"), the blocking signals persist, those for unblocking are almost null. In the collector circuit of the transistor 2 (FIG. 7, curve "*b*") the transfer points at the blocking fronts have almost totally disappeared, and the flat portions are improved.

FIG. 8 represents the same trigger circuit as that shown in FIG. 5, with certain improvements.

In FIG. 8, the components already shown in FIG. 5 are indicated by the same designations.

In the arrangement of FIG. 2, the diodes 24 and 25 connect respectively the polarization points 34 and 35 of the bases of the transistors 1 and 2 to the condensers 22 and 23 located at the input terminals 14 and 16 of the trigger circuit. By the intermediary of the resistance 36 connecting the diode 24 to the output 18, the point 38 follows the potential of the collector of the transistor 1. Similarly, by the intermediary of the resistance 37 connecting the diode 25 to the output 19, the point 39 follows the potential of the collector of the transistor 2.

When the collector of one of the transistors of the trigger circuit is at zero potential, the corresponding diode 24 or 25 is passing, and authorizes the passage of the control impulse coming from the inputs 14 or 16. In the blocking period of the same transistor, this same diode is no longer passing, and in consequence, the control impulse does not arrive at the wrong time to interfere with the operation of the trigger circuit.

The diodes 20 and 21, placed between the base and the emitter of the transistors, reduce the unblocking time and the slowing of the unblocking, as has been explained in connection with FIGS. 1 and 2.

The polarization point 34 relating to transistor 1 is connected to ground by the capacitance 62 and by the resistance 9 connected in series with a resistance 26 and a diode 60 in parallel.

Similarly, the polarization point 35 relating to transistor 2 is connected to ground by the capacitance 33 and by the resistance 10 connected in series with the resistance 27 and the diode 61 in parallel.

The diodes 60 and 61 offer a leakage path for the excess minority carriers remaining in the bases of the transistors following their operation at saturation output. They therefore improve the operation of the trigger circuit by reducing the blocking delay.

The role of the condensers 62 and 63 is to modify the impedance of the transformers, whose inductances, associated with the negative impedances introduced by the transistors 1 and 2, give a circuit with too low a cutoff frequency. Since, for this cutoff frequency, the input impedance presented to the control signals incoming to the trigger circuit is nil, the components contained in the said control signals and of frequencies superior or equal to the cutoff frequency involved, do not reach the bases of the transistors of the trigger circuit: from whence a limitation of the frequency of reversal.

The adjunction of the condensers 62 and 63, whose values are determined experimentally, permits increasing the value of the cutoff frequency.

In addition, the resistances 9 and 11 are also determined experimentally in order to obtain a certain adjustment of the impedance of the base circuit of the transistors.

The performances obtained with the arrangement of FIG. 8 are the following:

Limit of utilization:

(1) For recurrence: 5 megacycles
(2) For pairs of impulses, recurrence: 250 kilocycles
Spacing of impulses: 0.2 microsecond
Duration of control impulses: 0.1 microsecond
Duration of the fronts of the output signals:
(*a*) Blocking front: 0.04 microsecond
(*b*) Unblocking front: 0.10 microsecond.

The functioning of the trigger circuit may also take place for very low frequencies (16 cycles per second for example), or by manual tripping.

What is claimed is:

A trigger circuit of the Eccles-Jordan type comprising two alternately conducting transistors, each having base, emitter and collector electrodes; comprising cross-coupling paths, each between the collector of one transistor and the base of the other transistor, each said cross-coupling path including a transformer for substantially matching the impedance of the collector circuit of said one transistor and the base circuit of said other transistor, each said transformer having a closed ferrite core with windings wound on said core, a first one of said windings being included in the collector circuit of said one transistor and a second one of said windings being included in the base circuit of said other transistor; and comprising a pair of impedance networks each shunted across the base-emitter electrodes of the associated transistor in series relation with said second winding for raising the cut-off frequency of said circuit, each said network comprising a capacitor and in parallel connection therewith a resistance and a diode shunting a part of said resistance, said diode being poled so as to provide a leakage path for the excess minority carriers remaining on said base following saturation.

References Cited in the file of this patent

UNITED STATES PATENTS

| | | |
|---|---|---|
| 2,809,303 | Collins | Oct. 8, 1957 |
| 2,939,115 | Bobeck | May 31, 1960 |
| 2,974,238 | Lohman | Mar. 7, 1961 |
| 3,003,069 | Clapper | Oct. 3, 1961 |

FOREIGN PATENTS

| | | |
|---|---|---|
| 161,730 | Australia | Oct. 29, 1953 |
| 1,025,010 | Germany | Feb. 27, 1958 |